(12) United States Patent
Morsy-Osman et al.

(10) Patent No.: US 10,116,410 B2
(45) Date of Patent: Oct. 30, 2018

(54) OPTICAL TRANSMITTERS AND RECEIVERS USING POLARIZATION MULTIPLEXING

(71) Applicant: Telefonaktiebolaget LM Ericsson (publ), Stockholm (SE)

(72) Inventors: Mohamed Morsy-Osman, Montreal (CA); Mathieu Chagnon, Montreal (CA); David V. Plant, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/512,452

(22) PCT Filed: Sep. 18, 2015

(86) PCT No.: PCT/IB2015/057215
§ 371 (c)(1),
(2) Date: Mar. 17, 2017

(87) PCT Pub. No.: WO2016/042535
PCT Pub. Date: Mar. 24, 2016

(65) Prior Publication Data
US 2017/0250776 A1 Aug. 31, 2017

Related U.S. Application Data

(60) Provisional application No. 62/136,964, filed on Mar. 23, 2015, provisional application No. 62/052,930, filed on Sep. 19, 2014.

(51) Int. Cl.
*H04J 14/06* (2006.01)
*H04B 10/532* (2013.01)
(Continued)

(52) U.S. Cl.
CPC ........... *H04J 14/06* (2013.01); *H04B 10/532* (2013.01); *H04B 10/60* (2013.01); *H04B 10/40* (2013.01); *H04B 10/50* (2013.01)

(58) Field of Classification Search
None
See application file for complete search history.

(56) References Cited

U.S. PATENT DOCUMENTS

| | | | |
|---|---|---|---|
| 6,373,903 B1* | 4/2002 | Wynn | H04L 27/2075 375/283 |
| 2008/0170639 A1* | 7/2008 | Vassilieva | H04B 10/532 375/300 |

(Continued)

FOREIGN PATENT DOCUMENTS

WO 2011127959 A1 10/2011

OTHER PUBLICATIONS

Faruk et al., "Compensation for in phase/quadrature imbalance in coherent-receiver front end for optical quadrature amplitude modulation", Apr. 2013, IEEE Photonics Journal, vol. 5, No. 2, pp. 7800110 (Year: 2013).*

(Continued)

*Primary Examiner* — Darren E Wolf
(74) *Attorney, Agent, or Firm* — Murphy, Bilak & Homiller, PLLC (57) ABSTRACT

Disclosed is a transmitter that modulates a single-wavelength laser signal with multi-level amplitude modulation on each of two polarizations, with an additional multi-level inter-polarization phase modulation. In an experimental setup, four-level amplitude modulation is used on each of the two polarizations, and four-phase inter-polarization phase modulation is used. Other numbers of levels may be used, in variations of the disclosed techniques and apparatus. Also disclosed is a corresponding receiver, which includes a DSP algorithm that recovers, simultaneously, the informa- (Continued)

tion on the multiple intensities imprinted by the transmitter on each polarization and the information from the multi-level inter-polarization phase modulation.

20 Claims, 7 Drawing Sheets

(51) Int. Cl.
*H04B 10/60* (2013.01)
*H04B 10/40* (2013.01)
*H04B 10/50* (2013.01)

(56) References Cited

U.S. PATENT DOCUMENTS

| | | | |
|---|---|---|---|
| 2009/0274469 A1* | 11/2009 | Yuki | H04B 10/0799 398/152 |
| 2010/0178065 A1* | 7/2010 | Nishihara | |
| 2011/0044702 A1 | 2/2011 | Mizuguchi et al. | |

OTHER PUBLICATIONS

Chagnon, Mathieu et al., "Experimental study of 112 Gb/s short reach transmission employing PAM formats and SiP intensity modulator at 1.3 μm", Optics Express, Aug. 22, 2014, 1-19.

Che, DI et al., "Stokes vector direct detection for short-reach optical communication", Optics Letters, vol. 39, No. 11, Jun. 1, 2014, 3110-3113.

Chughtai, Mohsan Niaz, "Study of physical layer impairments in high speed optical networks", KTH Information and Communication Technology, Licentiate Thesis in Communication Systems, Stockholm, Sweden, 2012, 1-59.

Faruk, et al., "Compensation for In-Phase/Quadrature Imbalance in Coherent-Receiver Front End for Optical Quadrature Amplitude Modulation", IEEE Photonics Journal, vol. 5, No. 2, Apr. 2013, 1-11.

Joshi, M. A., "Next-Gen Communications Fiber: Multilevel modulation formats push capacities beyond 100 Gbit/s", Laser Focus World, vol. 48, Issue 2, laserfocusworld.com, Feb. 1, 2012, 1-9.

Kai, Yutaka et al., "Experimental Comparison of Pulse Amplitude Modulation (PAM) and Discrete Multi-tone (DMT) for Short-Reach 400-Gbps Data Communication", ECOC Th.1.F.3.pdf, 2013, 1-3.

Karar, Abdullah S. et al., "Generation and Detection of a 112-Gb/s Dual Polarization Signal Using a Directly Modulated Laser and Half-Cycle 16-QAM Nyquist-Subcarrier-Modulation", ECOC Postdeadline Papers, Th.3.A.4.pdf, 2012, 1-3.

Louchet, Hadrien et al., "Performance Monitoring for Coherent DP-QPSK Systems based on Stokes Vector Analysis", IEEE, 2011, 357-358.

Morsy-Osman, M. et al., "1λ×224 Gb/s 10 km Transmission of Polarization Division Multiplexed PAM-4 Signals Using 1.3 μm SiP Intensity Modulator and a Direct-Detection MIMO-based Receiver", 2014 European Conference on Optical Communication (ECOC), Cannes—France, Sep. 21-25, 2014, 1-3.

Norimatsu, Seiji et al., "The Influence of Cross-Phase Modulation on Optical FDM PSK Homodyne Transmission Systems", Journal of Lightwave Technology, vol. 11, No. 5/6, May/Jun. 1993, 795-804.

Olmedo, Miguel Iglesias et al., "Multiband Carrierless Amplitude Phase Modulation for High Capacity Optical Data Links", Journal of Lightwave Technology, vol. 32, No. 4, Feb. 15, 2014, 798-804.

Patel, David et al., "A 41 GHz Slow-Wave Series Push-Pull Silicon Photonic Modulator", Optical Society of America, SW3N.3.pdf, 2015, 1-2.

Poulin, M. et al., "107 Gb/s PAM-4 Transmission over 10 km Using a SiP Series Push-Pull Modulator at 1310 nm", IEEE 2014 European Conference on Optical Communication (ECOC), Cannes—France, Sep. 21-25, 2014, 1-3.

Quitin, Francois, "Channel Modeling for Polarized MIMO Systems", Thesis, 2011, 1-214.

Roberts, Kim, "Performance of Dual-Polarization QPSK for Optical Transport Systems", Journal of Lightwave Technology, vol. 27, No. 16, Aug. 15, 2009, 3546-3559.

Rodes, R. et al., "100 Gb/s single VCSEL data transmission link", 2012 and the National Fiber Optic Engineers Conference Optical Fiber Communication Conference and Exposition (OFC/NFOEC), PDP5D.10, Mar. 4-8, 2012, 1-3.

Traverso, Matt, "Photonic integration powers 100-Gbps DWDM", Lightwave, Mar. 1, 2010, 1-7.

Unknown, Author, "Polarized Light and the Stokes Parameters", Publication date unknown, 1-17.

Wang, Jianmin et al., "Small Signal Analysis for Dispersive Optical Fiber Communication Systems", Journal of Lightwave Technology, vol. 10, No. 1, Jan. 1992, 96-100.

Xie, Chongjin et al., "Hybrid 224-Gb/s and 112-Gb/s PDM-QPSK Transmission at 50-GHz Channel Spacing over 1200-km Dispersion-Managed LEAF® Spans and 3 ROADMs", Optical Society of America, 2011, 1-3.

Yan, Weizhen et al., "100 Gb/s Optical IM-DD Transmission with 10G-Class Devices Enabled by 65 GSamples/s CMOS DAC Core", OFC/NFOEC Technical Digest, OM3H.1.pdf, 2013, 1-3.

* cited by examiner

OPTICAL TRANSMITTERS AND RECEIVERS USING POLARIZATION MULTIPLEXING

TECHNICAL FIELD

The present application relates generally to optical transmitters and receivers, and more particularly relates to optical transmitter and receiver devices using polarization multiplexing.

BACKGROUND

Optical interconnects for short reach applications such as intra-data center information transport need to support more data throughput. Approaches should be cost effective, energy efficient, and require a small footprint. To meet these requirements, the use of a single-laser transmitter and a receiver having a passive optical receiver front-end and using direct detection should be employed.

With the recent standardization of 100 Gigabit/second (Gbps) Ethernet, it is generally agreed that achieving 100 Gbps and beyond on a single wavelength channel is mandatory to realize the envisioned 400 Gbps and 1 Terabit per second (Tbps) targets. Modulating a single laser provides a more scalable and cost effective solution than counterparts that involve the use of multiple wavelengths or multiple fiber lanes.

Demonstrations of 100 Gbps per wavelength have been reported for short-range transmissions, using various modulation formats. Some experiments employed polarization-division multiplexing (PDM) to halve the desired baud rate, i.e., the number of symbols per second, to reach 100 Gbps, with the polarization demultiplexing done optically, with a polarization controller/stabilizer.

Examples of these reported techniques include the use of four-level pulse-amplitude modulation (PAM-4) with PDM, as reported by R. Rodes, et al., "100 Gb/s single VCSEL data transmission link," in 2012 *Optical Fiber Communication Conference (OFC* 2012), paper PDP5D. 10, 2012. Other examples include an approach based on half-cycle Nyquist subcarrier PDM with 16-QAM, reported by A. Karar, et al., ECOC, paper PDP Th.3.A.4, 2012, and another based on multi-band CAP, reported by M. I. Olmedo, et al., in J. Lightwave Technol., vol. 32, no. 4, 2014. Still another example uses discrete multi-tone (DMT), as reported by W. Yan, et al., OFC, paper OM3H. 1, 2013. PDM was also used in a self-coherent system experiment reported by D. Che, et al., in Opt. Lett., vol. 39, no. 11, 2014. 112-Gbps PAM transmission was reported by the present inventors in M. Chagnon, et al., Opt. Exp. vol. 22, no. 17, 2014, and extended to include PDM for 224 Gbps over 10 kilometers (km), in M. Morsy-Osman, et al., ECOC 2014, Paper PD.4.4. All of the reports cited in this paragraph are incorporated by reference herein.

Despite these reported techniques, there still remains a need for cost-effective systems that transmit at data rates well beyond 100 Gbps, on a single wavelength.

SUMMARY

A first aspect of the techniques and apparatus disclosed herein is directed to an optical transmitter that comprises a laser having an output and further comprises an optical beam splitter having an input coupled to the output of the laser and two outputs configured so as to produce first and second optical signals. The optical transmitter further includes first and second optical intensity modulators having respective inputs coupled to the outputs of the beam splitter and configured to impress multi-level intensity modulation on the first and second optical signals, respectively, based on respective first and second information streams. The optical transmitter still further includes a phase modulator coupled in line with the second optical intensity modulator and configured to impress a multi-level phase modulation on the second optical signal, using a multi-level phase modulation signal derived from a third information stream, as well as an optical combiner having first and second inputs coupled to receive the intensity-modulated first optical signal and the intensity-and-phase-modulated second optical signal, respectively, and configured to combine the intensity-modulated first optical signal and the intensity-and-phase-modulated second optical signal to produce a polarization-multiplexed optical signal for transmission. The optical transmitter is configured so that the intensity-modulated first optical signal and the intensity-and-phase-modulated second optical signal in the polarization-multiplexed optical signal have first and second optical states of polarization, respectively.

A second aspect of the techniques and apparatus disclosed herein is directed to an optical receiver that comprises an optical receiver front-end configured to receive a polarization-multiplexed optical signal and to split the polarization-multiplexed optical signal into sub-components comprising first and second signals, proportional to a time-varying intensity for each of first and second orthogonal states of polarization of the received signal, respectively, and third and fourth signals proportional to $S_2^r = 2\text{Re}\{E_x^r E_y^{r*}\}$ and $S_3^r = 2\text{Im}\{E_x^r E_y^{r*}\}$, respectively, where $E_x^r$ and $E_y^r$ are complex time-varying values for the first and second orthogonal states of polarization of the received signal, respectively. The optical receiver further comprises a digital signal processing circuit operatively coupled to the optical receiver front-end and configured to receive digitized versions of the first, second, third, and fourth signals, said digital signal processing circuit being further configured to implement a matrix arrangement of Finite Impulse Response (FIR) filters receiving the digitized versions of the first, second, third, and fourth signals and to thereby substantially remove polarization rotation induced by transmission of the polarization-multiplexed optical signal from a polarization-division-multiplexing optical transmitter to the optical receiver and estimate first and second information streams used by a polarization-division-multiplexing optical transmitter to intensity-modulate first and second optical states of polarization in the transmitted polarization-multiplexed optical signal.

In some embodiments according to this second aspect, the matrix of FIR filters comprises four 1×1 FIR filters, inputs to the four 1×1 FIR filters corresponding to the digitized versions of the first and second signals, the digitized version of the third signal, and the digitized version of the fourth signal. In these embodiments, the digital signal processing circuit is configured to obtain an estimate of the first information stream by summing outputs of the four 1×1 FIR filters and to obtain an estimate of the second information stream by summing outputs of three of the four 1×1 FIR filters and subtracting the summed outputs of the three of the four 1×1 FIRs from the output of the fourth 1×1 FIR filter, the input to the fourth 1×1 FIR filter being the sum of the digitized versions of the first and second signals.

In other embodiments according to this second aspect, the matrix of FIR filters comprises a 4×4 filter matrix followed by four 1×1 filters coupled to respective outputs of the 4×4 filter matrix, where the inputs to the 4×4 matrix are coupled to digitized versions of the first, second, third, and fourth signals, respectively. In these embodiments, an estimate of the first information stream is obtained from the output of a first one of the four 1×1 filters, and an estimate of the second information stream is obtained from the output of a second one of the four 1×1 filters. An estimate of a third information stream is obtained by summing the outputs of the third and fourth ones of the four 1×1 filters in a complex fashion. The angle of the complex addition is then calculated, to obtain an estimate of a third information stream. The third information stream corresponds to a time-varying phase difference between the two orthogonal optical states of polarization in the transmitted polarization-multiplexed optical signal, as imposed by a polarization-division-multiplexing optical transmitter.

A third aspect of the presently disclosed techniques and apparatus is directed to a method of generating a modulated optical signal. The method includes impressing a first intensity modulation on a first optical signal, to obtain a first intensity-modulated signal, where the first intensity modulation is based on a first modulation signal derived from a first stream of information bits. The method further includes impressing a second intensity modulation on a second optical signal, to obtain a second intensity-modulated signal, where the second intensity modulation is based on a second modulation signal derived from a second stream of information bits. The method still further includes impressing a multi-level phase modulation on the first intensity-modulated signal, to obtain an intensity-modulated and inter-polarization-phase-modulated signal. The polarization of the first optical signal or the second optical signal, or both, is rotated. The intensity-modulated and inter-polarization-phase-modulated signal and the second intensity-modulated signal are then combined, and the combined signal is transmitted via an optical fiber. The rotating of the polarization of the first and/or second optical signal is performed in such a way that the intensity-modulated and inter-polarization-phase-modulated signal and the second intensity-modulated signal, as combined and transmitted, have first and second optical states of optical polarization.

A fourth aspect of the presently disclosed techniques and apparatus is directed to a method that comprises receiving an intensity-modulated, polarization-division multiplexed optical signal with inter-polarization phase modulation, and detecting a time-varying intensity for each of first and second orthogonal polarizations of the received optical signal. Signal components $S_2^r = 2\text{Re}\{E_x^r E_y^{r*}\}$ and $S_3^r = 2\text{Im}\{E_x^r E_y^{r*}\}$ are also detected, where $E_x^r$ and $E_y^r$ are the first and second orthogonal polarizations of the received signal. The method further includes de-rotating the detected intensities for the first and second orthogonal polarizations of the received optical signal and the detected signal components $S_2^r$ and $S_3^r$, so as to compensate for polarization rotation imposed on the signal between the transmitter of the received optical signal and said detecting operations. First and second information bit streams are demodulated from the de-rotated first and second orthogonal polarizations of the received optical signal, the first and second information bit streams corresponding to first and second polarization-division-multiplexed intensity modulations on the optical signal as received. A third information bit stream is demodulated from de-rotated signal components $S_2$ and $S_3$ corresponding to the detected signal components $S_2^r$ and $S_3^r$, the third information bit stream corresponding to the inter-polarization phase modulation on the optical signal as received.

Of course, the present invention is not limited to the above features. Those of ordinary skill in the art will recognize additional features and advantages of the disclosed techniques and apparatus upon reading the following detailed description, and upon viewing the accompanying drawings.

DETAILED DESCRIPTION

Various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Aspects of the invention may be described below in terms of sequences of actions or functions to be performed by elements of a computer system or other hardware capable of executing programmed instructions. It will be recognized that the various actions could be performed by specialized circuits, by program instructions being executed by one or more processors, or by a combination of both.

In some alternate implementations, the functions/acts may occur out of the order noted in the sequence of actions.

Several of the embodiments described herein concern optical transmitters and receivers that use intensity modulation and polarization multiplexing, with a direct-detection approach employed in the receivers. Some of the embodiments also exploit inter-polarization phase modulation. The optical receivers described herein include a multiple-input and multiple-output (MIMO) digital signal processor (DSP) algorithm operating in the Stokes space, following a direct-detection receiver front-end. Modulating the intensity of the two orthogonal polarization states of a single laser enables either doubling the maximum achievable bit rate on a single wavelength channel or halving the required baud rate (and consequently the bandwidth of electronic components) to achieve a given bit rate on a single wavelength. Adding the inter-polarization modulation allows the maximum achievable bit rate on the single wavelength channel to be increased even further (or the required baud rate to achieve a certain baud rate to be reduced even further).

For the sake of clarity, we define polarization as a property of the electromagnetic light wave, which describes the direction of oscillation of the electric field associated with the electromagnetic wave. Two orthogonal polarizations states result, for example, from applying an optical signal, rotated by 45 degrees, to a polarizing beam splitter (PBS), which provides at its two outputs two electromagnetic waves having their electric fields oscillating at perpendicular directions. Alternatively, two orthogonal polarization states may be produced by first splitting an optical signal carried in a polarization-maintaining fiber (PM fiber) with a polarization-maintaining optical beam splitter. One of the two output branches then receives a 90-degree polarization rotation, e.g., using a polarization controller, before the signals on the two branches are orthogonally combined by a polarization beam combiner.

Figure 1:
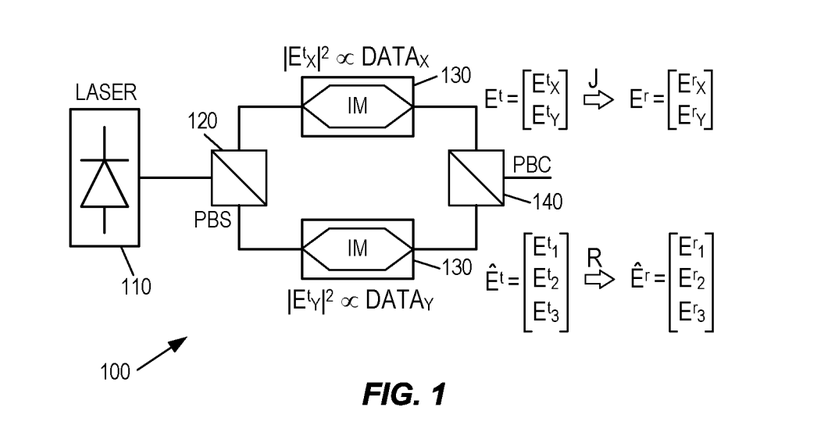
FIG. 1 illustrates an example optical polarization-division multiplexing transmitter.

FIG. 1 is a block diagram illustrating components of an example optical transmitter 100, employing polarization-division multiplexing (PDM). Such a transmitter is described in M. Morsy-Osman, M. Chagnon, M. Poulin, S. Lessard, D. V. Plant, "1□×224 Gb/s 10 km Transmission of Polarization Division Multiplexed PAM-4 Signals Using 1.3 □m SiP Intensity Modulator and a Direct-Detection MIMO-based Receiver," in Proc. of ECOC, Paper PD.4.4, September 2014, the contents of which are included herein by reference in their entirety.

Optical transmitter 100 comprises a single-wavelength laser diode 110, the output of which is coupled to an optical beam splitter 120, in this case illustrated as a polarizing beam splitter. Optical beam splitter 120 has first and second outputs, producing first and second states of polarization, respectively, of the optical carrier generated by laser diode 110. These first and second states of polarization are orthogonal or substantially orthogonal to one another.

The first and second outputs of optical beam splitter 120 are coupled to first and second optical intensity modulators 130, respectively. The first and second optical intensity modulators are independently driven by first and second drive signals (not shown) derived from first and second information streams, respectively, according to any amplitude-based modulation scheme, such as the multi-level pulse-amplitude modulation (PAM) schemes discussed above. The intensity-modulated outputs of the first and second optical intensity modulators 130 are combined with optical beam combiner 140. The output of optical beam combiner 140 thus comprises a polarization-division multiplexed optical signal that comprises intensity modulated signals on each polarization, as produced by the first and second optical intensity modulators 130.

The transmitted optical signal can be also called the transmitted field. The word "field" is used interchangeably with the word "signal" in the context of this description. Transmitted field refers to the light field or, more specifically, the electrical field of the electromagnetic light wave. The field can be denoted by E, to distinguish it from the intensity of the field, which is $|E|^2$. The field has both magnitude and phase (complex), whereas the intensity is the squared magnitude of the field.

The transmitted signal can be equivalently represented by a Jones vector $E^t = [E_x^t E_y^t]$ or a 3-dimensional Stokes vector $E^t = [E_1^t\ E_2^t\ E_3^t]$, where these representations are related according to $E_1^t = |E_x^t|^2 - |E_y^t|^2$, $E_2^t = 2\text{Re}\{E_x^t E_y^{t*}\}$, and $E_3^t = 2\text{Im}\{E_x^t E_y^{t*}\}$. When discussing Stokes vector representation of an optical signal, a $0^{th}$ Stokes parameter, which represents the total intensity, is defined as $E_0^t = |E_x^t|^2 + |E_y^t|^2$.

Propagation through a fiber channel results in a transmission impairment for the signal called polarization rotation, which can be mathematically modeled as a unitary transformation. This unitary transformation can be mathematically modeled by either a 2×2 complex-valued matrix J or a 3×3 real-valued matrix R. In the Stokes space, this transformation is expressed as $E^r = RE^t = [E_1^r\ E_2^r\ E_3^r]^T$, where $E^r$ is the received field and where the entries of the matrix R represents the unknown polarization rotation that occurs during transmission from the optical transmitter to the optical receiver. This unknown polarization rotation is estimated at the optical receiver, so that information impressed on the transmitted signal $E^t$ can be recovered. Note that the $0^{th}$ Stokes parameter of the signal is not impacted by the unitary rotation, thus $E_0^r = E_0^t$ (leaving aside the change in amplitude that occurs during the transmission).

Generally, then, the transmitted and received fields can thus be represented by 4D power vectors in the form $[|E_x|^2, |E_y|^2, S_2, S_3]^T$, where $S_2 = 2\text{Re}\{E_x E_y^*\}$ and $S_3 = 2\text{Im}\{E_x E_y^*\}$. Polarization rotation in single-mode fiber (SMF) can be represented by a unitary rotation matrix that is applied to the transmitted Jones vector $[E_x^t E_y^t]^T$. Using a generic matrix of elements a and b related to one another according to $|a|^2 + |b|^2 = 1$, the equation below shows the 4-by-4 matrix relating the transmitted and received 4D power vectors $E^r$ and $E^t$:

$$\begin{bmatrix} E_x^r \\ E_y^r \end{bmatrix} = \begin{bmatrix} a & -b \\ b^* & a^* \end{bmatrix} \begin{bmatrix} E_x^t \\ E_y^t \end{bmatrix} \Rightarrow \begin{bmatrix} |E_x^r|^2 \\ |E_y^r|^2 \\ S_2^r \\ S_3^r \end{bmatrix} =$$

$$\begin{bmatrix} |a|^2 & |b|^2 & -\text{Re}\{ab^*\} & -\text{Im}\{ab^*\} \\ |b|^2 & |a|^2 & \text{Re}\{ab^*\} & \text{Im}\{ab^*\} \\ 2\text{Re}\{ab\} & -2\text{Re}\{ab\} & \text{Re}\{a^2\} - \text{Re}\{b^2\} & \text{Im}\{a^2\} + \text{Im}\{b^2\} \\ 2\text{Im}\{ab\} & 2\text{Im}\{ab\} & I\text{Im}\{a^2\} - \text{Im}\{b^2\} & \text{Re}\{a^2\} + \text{Re}\{b^2\} \end{bmatrix} \begin{bmatrix} |E_x^t|^2 \\ |E_y^t|^2 \\ S_2^t \\ S_3^t \end{bmatrix}$$

Figure 2:
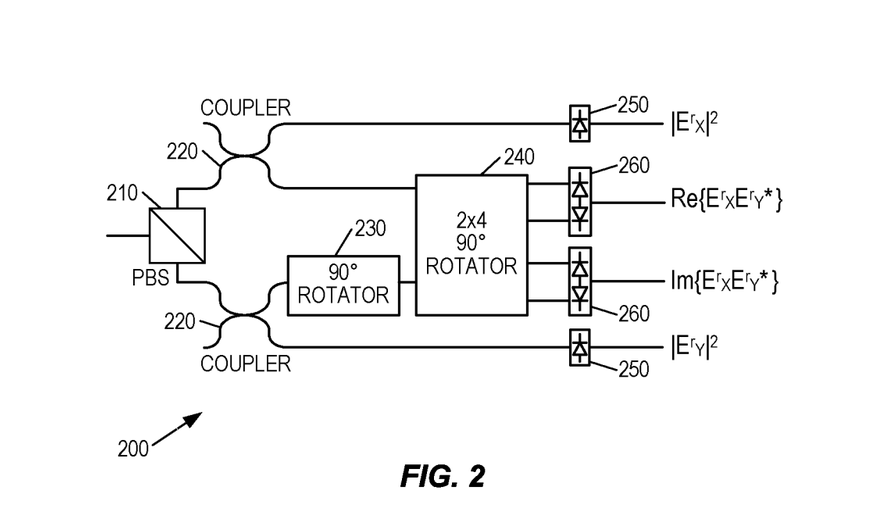
FIG. 2 illustrates an example optical front-end.

FIG. 2 illustrates elements of a receiver front-end 200, which is arranged to detect the components of the 4D received power vector $[|E_x^r|^2, |E_y^r|^2, S_2^r, S_3^r]^T$ after transmission of the transmitted field $E^r$ through an optical fiber. The receiver front-end 200 comprises a polarizing beam splitter (PBS) 210 having an input that, during operation, is coupled to a single-mode optical fiber linking the receiver to the optical transmitter 100. Polarization beam splitter 210 splits the received optical signal into two signals with orthogonal polarizations, i.e., two electromagnetic waves having their electric fields oscillating at perpendicular directions. The two outputs of polarization beam splitter are each coupled to an optical coupler 220 (e.g., a 50/50 or 90/10 coupler)—in the illustrated embodiment, these couplers 220 are polarization-maintaining devices, in that they do not impact the relative polarizations of their outputs. One output from each of the couplers 220 is directly detected, with detectors 250, to obtain the signal components $|E_x^r|^2$ and $|E_y^r|^2$. Note that scaling factors are omitted in FIG. 2 and throughout the present discussion, for simplicity. The other output from each coupler 220 is supplied to a 2×4 90° hybrid 240, after the output from one coupler is polarization-rotated by 90° by rotator 230. These inputs to the 2×4 90° hybrid 240 are beat against each other to provide differential outputs, as illustrated in FIG. 2 and as explained in further detail below. The differential outputs from the 2×4 90° hybrid 240 are detected, with detectors 260, to obtain the signal components $S_2^r$ and $S_3^r$.

Figure 3:
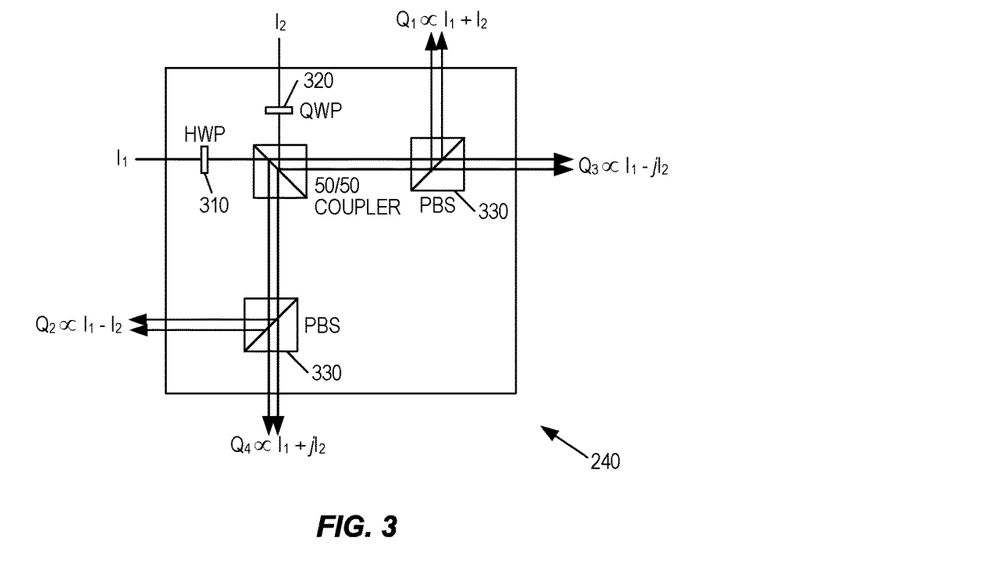
FIG. 3 illustrates a 90° hybrid, as used in some embodiments of the optical front-end of FIG. 2.

FIG. 3 is a block diagram of an example 2×4 90° hybrid 240, where $I_1$ and $I_2$ denote the two inputs and $O_1$-$O_4$ denote the four outputs. $O_1$ and $O_2$ represent one of the two differential pairs that are detected in the front-end 200 shown in FIG. 2, while $O_3$ and $O_4$ make up the other. In the illustration, HWP 310 is a half-wave plate, QWP 320 is a quarter-wave plate, and PBS 330 is a polarization beam splitter. The outputs of the 90° hybrid correspond to $I_1+I_2$, $I_1+jI_2$, $I_1-I_2$, and $I_1-jI_2$, where $j=\sqrt{-1}$.

In a link comprising the optical transmitter 100 shown in FIG. 1 and the optical receiver front-end 200 shown in FIG. 2, information is carried on the time-varying intensities of the X and Y components of the transmitted signal, i.e., $|E_x^t(t)|^2$ and $|E_y^t(t)|^2$. With four-level PAM on each polarization, two bits per symbol per polarization are transmitted, for example.

Because the received polarization-division multiplexed optical signal has two independent information streams impressed on its orthogonal polarizations by intensity modulation at the transmitter, the receiver has to split the received signal into two orthogonal polarizations to retrieve the information. Since the information is imprinted on the intensities of the X and Y components of the transmitted signal $E^t$, the only parameters needed at the receiver to retrieve the information are estimates of the Stokes parameters $E_0^t$ and $E_1^t$, which are the sum and difference, respectively, of the transmitted intensities $|E_x^t|^2$ and $|E_y^t|^2$. However, a problem here is that because of the polarization rotation imposed during transmission of the optical signal between the optical transmitter and the optical receiver, the principal axes of the polarization beam splitter in optical receiver front-end 200 are not likely to be aligned with those of the transmitter, which means that $|E_x^r|^2$ is most likely not equal to $|E_x^t|^2$, and $|E_y^r|^2$ is most likely not equal to $|E_y^t|^2$. In other words, while the polarization beam splitter 210 in the optical front-end 200 shown in FIG. 2 resolves the received optical signal into two orthogonal components, it does so without any reference to the coordinate system of the optical transmitter. This is analogous to finding the x and y components of a vector where the coordinate system of the receiver may be different from the original coordinate system.

Since $E_0^t$ is insensitive to the polarization rotation, an estimate $\hat{E}_0^t$ can be recovered by simply summing the detected intensities $|E_x^r|^2$ and $|E_y^r|^2$, which are available directly from the optical front-end 200 of FIG. 2, to obtain the $0^{th}$ Stokes parameter $E_0^r$ and filtering $E_0^r$, using a FIR filter, to obtain the estimate $\hat{E}_0^r$ of the $0^{th}$ Stokes parameter of the originally transmitted optical signal.

Obtaining an estimate $\hat{E}_1^t$ of the Stokes parameter $E_1^t$ requires additional processing, however, because of the polarization rotation imposed on the optical signal between the optical transmitter and optical receiver. This additional processing can be performed with a digital signal processor (DSP) implementing a multiple-input single-output (MISO) filter acting upon the Stokes parameters of the received field, namely, $E_1^r$, $E_2^r$, and $E_3^r$. Since $E_2^r = 2\text{Re}\{E_x^r E_y^{r*}\}$ and $E_3^r = 2\text{Im}\{E_x^r E_y^{r*}\}$, these two received field Stokes parameters are available directly from the optical front-end 200 of FIG. 2 (again, ignoring any scaling factor). The Stokes parameter $E_1^r$ can be obtained by subtracting the detected intensity $|E_y^r|^2$ from the detected intensity $|E_x^r|^2$.

Figure 4:
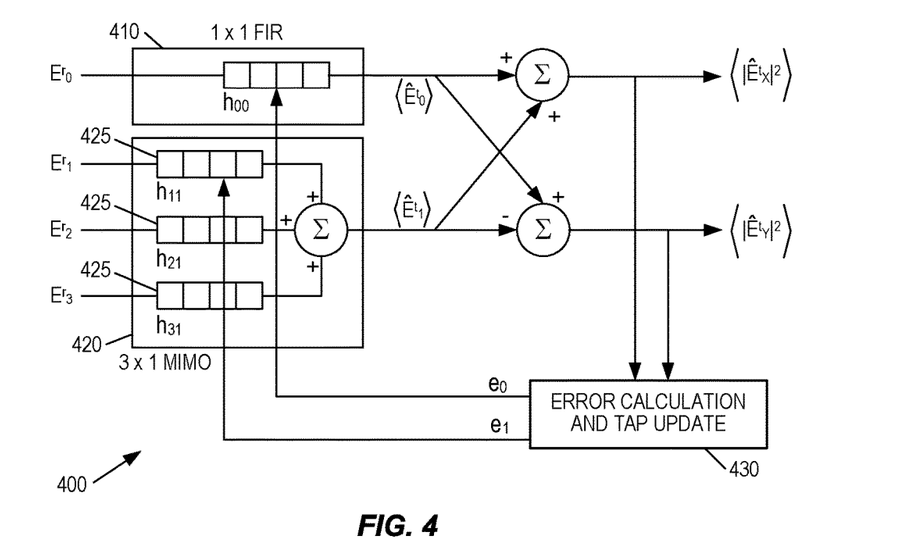
FIG. 4 illustrates an example digital signal processing stack for use in an optical receiver.

FIG. 4 is a block diagram illustrating the operations carried out by an example DSP, according to some embodiments of the presently disclosed techniques. This DSP performs the polarization demultiplexing, correcting for the unknown polarization rotation of the received optical signal, and recovers the originally transmitted information from the demultiplexed modulation signals.

As seen in FIG. 4, the DSP implements a SISO Finite Impulse Response (FIR) filter 410, and a 3×1 MISO filter 420. FIR filter 410 and 420 might alternatively be referred to as a Single-Input Single-Output (SISO) filter and Multiple-Input-Single-Output filter, respectively, with the latter term accounting for the fact that the outputs from three linear filters 425 in 3×1 MISO filter 420 are summed, to provide a single output. The combination of FIR filter 410 and 3×MISO filter 420 might also be referred to as a MIMO filter, since it has four inputs (the Stokes parameters) and two outputs.

FIR filter 410 filters the $0^{th}$ Stokes parameters $E_0^r$, using a single-input single-output finite impulse response filter with N real-valued taps $h_{00}$, to mitigate inter-symbol interference (ISI) and provide an estimate $\hat{E}_0^t$ of the $0^{th}$ Stokes parameter of the originally transmitted optical signal. This estimate is denoted by $\hat{E}_0^t = h_{00}^T E_0^r$, where $h_{00}^T$ denotes the vector transpose of $h_{00}$ and $E_0^r$ denotes an N×1-tap input vector that contains N successive time samples of the $0^{th}$ Stokes parameter of the received optical, as detected by the optical front-end 200.

The lower part of the DSP stack shown in FIG. 4 is a 3×1 multiple-input single-output (MISO) bank of FIR filters 425, with tap weight vectors $h_{11}$, $h_{21}$, and $h_{31}$, each having N real-valued taps, the FIR filters 425 accepting the Stokes parameters $E_1^r$, $E_2^r$, and $E_3^r$ as inputs and providing an estimate $\hat{E}_1^t$ of the $1^{st}$ Stokes parameter of the originally transmitted optical signal according to $\hat{E}_1^t = h_{11}^T E_1^r + h_{21}^T E_2^r + h_{31}^T E_3^r$, where $E_0^r$, $E_0^r$, and $E_0^r$ denote N×1 tap input vectors that contain N successive time samples of the $1^{st}$, $2^{nd}$, and $3^{rd}$ Stokes parameters of the received optical signal. This estimation removes the polarization rotation and simultaneously mitigates ISI. Note that in the extreme case of using single tap filters (N=1), $h_{11}$, $h_{21}$, and $h_{31}$ should represent an estimate of the first row of the inverse of the rotation matrix, $R^{-1}$. In this case, MIMO filter 420 would not perform ISI mitigation.

As seen in FIG. 4, estimates $|\hat{E}_x^t|^2$ and $|\hat{E}_y^t|^2$ of the intensities of the originally transmitted polarization-multiplexed optical signals can be obtained by computing the sum and differences, respectively, of the estimated Stokes parameters $\hat{E}_0^t$ and $\hat{E}_1^t$ obtained from FIR filter 410 and 3×1 MIMO filter 420. These recovered estimates are proportional to the modulation signals applied to the orthogonal states of polarization in the optical transmitter, so the original information streams can be recovered directly from these estimates.

The real-valued tap weight vectors $h_{00}$, $h_{11}$, $h_{21}$, and $h_{31}$ can be adapted, e.g., using Least-Means Square (LMS) algorithm. This adaptation effectively corrects and tracks the alignment between the reference polarization axes in the optical transmitter and optical receiver, while simultaneously mitigating inter-symbol interference. In FIG. 4, this is shown at error calculation and tap update function 430, which may be implemented with an algorithm executed by digital signal processing circuitry. This algorithm updates the taps $h_{00}$, $h_{11}$, $h_{21}$, and $h_{31}$ of 1×1 FIR filter 410 and 3×1 MIMO filter 420, based on two error signals calculated from the estimates $|\hat{E}_x^t|^2$ and $|\hat{E}_y^t|^2$ according to $e_x = |E_x^t|_d^2 - |\hat{E}_x^t|^2$ and $e_y = |E_y^t|_d^2 - |\hat{E}_y^t|^2$, where $|E_x^t|_d^2$ and $|E_y^t|_d^2$ are the desired equalizer outputs from the complete MIMO filter when fed with known training symbols, before switching from an equalizer training mode to a decision-directed mode at steady state. In the decision-directed mode, $|E_x^t|_d^2 = |\hat{E}_x^t|_{HD}^2$ and $|E_{y'}^t|_d^2 = |\hat{E}_{y'}^t|_{HD}^2$, where the subscript HD denotes a hard decision applied to the equalizer outputs.

The error signals $e_x$ and $e_y$ are used to update the tap weights for the $(i+1)^{th}$ symbol based on the error signals and the tap weights at the $i^{th}$ symbols, using the least-mean-squares (LMS) algorithm as follows:

$$h_{00}^{i+1} = h_{00}^i + \mu(e_x + e_y)E_0^r$$

$$h_{11}^{i+1} = h_{11}^i + \mu(e_x - e_y)E_1^r$$

$$h_{21}^{i+1} = h_{21}^i + \mu(e_x - e_y)E_2^r$$

$$h_{31}^{i+1} = h_{31}^i + \mu(e_x - e_y)E_3^r$$

where $\mu$ is an adaptation step size and $E_k^r$ represents an N-tap input vector corresponding to the $k^{th}$ received Stokes parameter.

In an experimental setup (not illustrated), a 20-milliwatt (mW) 1310-nm NEL™ distributed feedback (DFB) laser was externally modulated by a packaged system-in-package (SiP) intensity modulator. A differential radio frequency (RF) signal was generated from a 70-Gigasamples/second (GSa/s) 8-bit digital-to-analog converter (DAC) and amplified using an Inphi™ linear driver. The output of the Inphi linear driver is applied to the SiP modulator, which was constantly operated at the quadrature point of the optical power-transfer function. The single polarization modulated signal was then amplified using a Thorlabs™ 1310-nm polarization-sensitive booster optical amplifier (BOA) and then fed to a polarization-division-multiplexing (PDM) emulator to generate a PDM intensity-modulated (IM) signal.

The decorrelation delay of the emulator between the two orthogonal SOPs should correspond to an integer number of symbols at the baud rate of operation. Also, the delay should be sufficiently small (<150 ps) to ensure that the laser phases at both transmitted polarizations are approximately the same, in order for the DSP to function reliably. In a true PDM IM transmitter, where two separate modulators are available and no emulation is needed, the two optical paths from the polarizing beam splitter (PBS) to the polarization beam combiner (PBC) can be matched to guarantee the same laser phase on both polarizations.

Next, the signal in the experimental setup was filtered, using a 1-nm optical filter to reject the out-of-band noise from the BOA. It is noteworthy that the combination of the BOA and the filter were used to counteract some of the insertion loss (IL) of the optical components, such as the SiP modulator (IL~14 decibel (dB) at maximum transmission), the PDM emulator (IL~4 dB), and the receiver front-end (IL~7 dB from the PBS input to either one of the detectors that measure $|E_x^r|^2$ and $|E_{y'}^r|^2$.)

Next, the signal was, in respective tests, launched into either 0, 2, 10 or 20 km of Corning™ SMF-28e+optical fiber. At the receiver, the front-end was followed by six single-ended Picometrix™ receivers, each comprising a p-type/intrinsic/n-type (PIN) photodiode followed by a transimpedance amplifier (TIA), to detect the Stokes parameters. In the experimental setup, this was done instead of using balanced photodetectors. The signals were then sampled by two Agilent™ Q-series real-time oscilloscopes at 80-GSamples/s, with the samples being stored for offline processing.

In a live embodiment, the signal can of course be processed immediately, without storing, for example using an application specific integrated circuit (ASIC) that performs the DSP operations described above in real time, on digital samples obtained by sampling the analog signals at the outputs of the six receivers using analog-to-digital converters (ADCs).

Regarding the digital signal processing employed, the transmitter side DSP includes pulse shaping, pre-compensation of the limited frequency response of all transmitter side components, and pre-compensation of the nonlinear optical transfer function of the modulator. In the experimental setup, the transmitted samples were prepared offline after applying this transmitter-side processing, and then loaded to the memory of the DACs that fed the intensity modulator. In a live embodiment, the transmitted bits can be processed in real-time, e.g., again using an ASIC that executes the DSP operations and feeds the samples to the DACs in a real-time fashion.

In the experimental embodiment, at the receiver side, offline processing started by subtracting waveforms captured at the balanced output pairs of the 2×4 hybrid to eliminate the direct detection terms and obtain $E_2^r$ and $E_3^r$. Then, the waveforms captured from the other oscilloscope, corresponding to $|E_x^r|^2$ and $|E_{y'}^r|^2$, were added and subtracted to obtain $E_0^r$ and $E_1^r$, respectively. The four waveforms $E_0^r$, $E_1^r$, $E_2^r$ and $E_3^r$ were then resampled to 2 samples per symbol, depending on the baud rate, and then filtered with matched filters before being fed to the MIMO DSP algorithm, which recovered the estimates of the transmitted intensities $|\hat{E}_x^t|^2$ and $|\hat{E}_{y'}^t|^2$ as explained above. Finally, a hard decision was performed on the estimated intensities, the recovered bits were compared to the transmitted bits, and the bit-error-rate (BER) calculated.

BERs for both PDM and single polarization PAM-4 signals were compared to one another, for both the 0 and 20 km fiber scenarios, to verify the penalty of PDM compared to single polarization transmission (i.e., where one branch of emulator is disconnected) operating at the same baud rate, i.e. half the bit rate. It was observed that there is no penalty at high baud rates whereas there was a slight increasing penalty as the baud rate decreases. This is due to the saturation of the TIAs which impacts the PDM system especially when the polarization angle mismatch between the transmitter and receiver is closer to 45°. In this experimental setup, reducing the received power potentially avoids the TIA saturation problem but also increases the impact of receiver thermal noise.

The results obtained from the experimental setup clearly show that the optical transmitter and receiver configurations described above enable the doubling of the maximum achievable bit rate, compared to single polarization transmission, and enable 112 Gb/s using either PAM-2 or PAM-4, with very low BERs ($10^{-5} \sim 10^{-6}$), if operated close to the optimum received power, which reduces the forward error correction (FEC) overhead requirement dramatically and hence reducing the power consumption of the transceiver's integrated circuits (ASICs) compared to a single polarization system that delivers 112 Gb/s. With the potential improvements of the coupling losses of the SiP modulator as well as the prospect of integrating all the discrete optical components at the receiver front-end on the same SiP chip, the losses are expected to decrease and enable the power budget with no optical amplifier.

The discussion above provided details of an optical transmitter and receiver that operated using polarization multiplexing of two intensity-modulated orthogonal states of polarization. Further improvements in throughput can be obtained by adding inter-polarization phase modulation to the system. This modified system includes an optical transmitter that is augmented with a phase modulator in one branch of the optical transmitter, with the phase modulator driven by a modulation signal corresponding to a third information stream. The optical receiver includes a multiple-input multiple-output (MIMO) digital signal processing algorithm operating in the Stokes space, following a direct-detection optical front-end that can be identical to the one illustrated in FIG. 2 and described above. As shown above, the intensity modulation of the two orthogonal polarization states of a single laser enables either doubling the maximum achievable bit rate on a single wavelength channel or halving the required baud rate (and consequently the bandwidth of electronic components) to achieve a given bit rate on a single wavelength. Adding the inter-polarization phase modulation, as described in further detail below allows the maximum achievable bit rate on the single wavelength channel to be increased even further (or the required baud rate to achieve a certain baud rate to be reduced even further).

Figure 5:
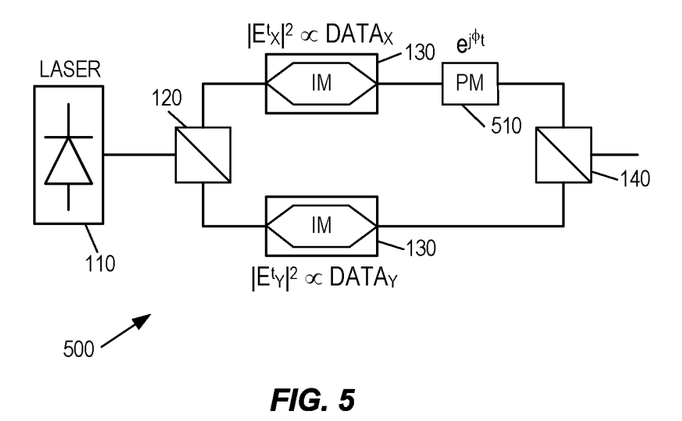
FIG. 5 illustrates another example optical polarization-division multiplexing transmitter, where intensities on each polarization and the inter-polarization phase can each be modulated.

FIG. 5 illustrates an example optical transmitter 500 employed in this modified system. As was the case in the optical transmitter shown in FIG. 1, the transmitter 500 of FIG. 5 comprises a laser 110, a polarization beam splitter 120, and a pair of intensity modulators (IMs) 130, in parallel branches. The two branches are polarization combined, with polarization beam combiner 140. Unlike the transmitter shown in FIG. 1, however, one of the branches in optical transmitter 500 also comprises an optical phase modulator (PM) 510. Thus, the transmitter externally intensity modulates a single laser, by impressing two independent information streams on each of two orthogonal states of polarization (SOPs) of the signal originating from a single laser. One of the intensity modulators is followed (or preceded) by the phase modulator, which modulates the phase difference between the two orthogonal SOPs, using a third independent information stream, before the SOPs are combined. This allows for modulation over three degrees of freedom.

In the transmitter shown in FIG. 1, the time-varying Jones vector is $[|E_x^t(t)|, |E_y^t(t)|e^{j\Phi_t(t)}]^T$, with powers $|E_x^t(t)|^2$ and $|E_y^t(t)|^2$ per polarization state, one of which polarization states also receives a 4-level phase modulation (PM) signal. As described in further detail below, the last two elements of the estimated derotated power vector (i.e., $\hat{S}_2^r$ and $\hat{S}_3^r$) can be used to obtain phase data from the received optical signal, by calculating the angle of the complex sum $\hat{S}_2^r+j\hat{S}_3^r$. Recovered estimates of the intensities per state of polarization and of the inter-polarization phase correspond to the three independently transmitted information streams. With four-level PAM on each polarization, two bits per symbol per polarization are transmitted. Two more bits per symbol are impressed on the transmitted signal via four-phase inter-polarization modulation.

As was the case with the polarization-division multiplexed intensity-modulated signal produced by the optical transmitter of FIG. 1, the optical signal produced by transmitter 500 has two independent information streams impressed on its orthogonal polarizations by intensity modulation at the transmitter. Thus, the receiver has to split the received signal into two orthogonal polarizations to retrieve the information. Again, of course, the principal axes of the receiver PBS are not necessarily aligned with that of the PBC of the transmitter, which means that $|E_x^r|^2$ is not likely to be equal to $|E_x^t|^2$, and $|E_y^r|^2$ is not likely to be equal to $|E_y^t|^2$.

As detailed below, this alignment can be corrected through an algorithm to update the taps of the MIMO filter, where the algorithm receives error signals, evaluated using an error calculator as explained below, the current tap values, and the current tap input vectors as inputs. For each received symbol, the updated tap values to be used for the next symbol are calculated with a least-means-square algorithm, thus minimizing the error signals, as explained below. A digital signal processing algorithm can then retrieve the transmitted intensities from the received ones. The digital signal processing algorithm can also retrieve the 4-level inter-polarization phase modulation impressed on the transmitted signal by recovering the phase between the polarizations, using the signal components $S_2^r$ and $S_3^r$.

An optical receiver for recovering the three information streams from the optical signal produced by optical transmitter 500 can comprise an optical front-end identical to that shown in FIG. 2, as described in detail above. This receiver front-end 200 is arranged to detect the components of the 4D received power vector $[|E_x^r|^2, |E_y^r|^2, S_2^r, S_3^r]^T$, after transmission of the transmitted field $E^t$ through an optical fiber. As noted above, $S_2^r=2\text{Re}\{E_x^r E_y^{r*}\}$ and $S_3^r=2\text{Im}\{E_x^r E_y^{r*}\}$. Note that when the inter-phase modulation is added, as shown in FIG. 5. $E_x^t$ includes an inter-polarization phase-modulation component that is manifested in the received components $E_x^r$ and $E_y^r$; an estimate of this phase component needs to be recovered, in addition to estimates of the transmitted intensities $|E_x^t|^2$ and $|E_y^t|^2$.

Figure 6:
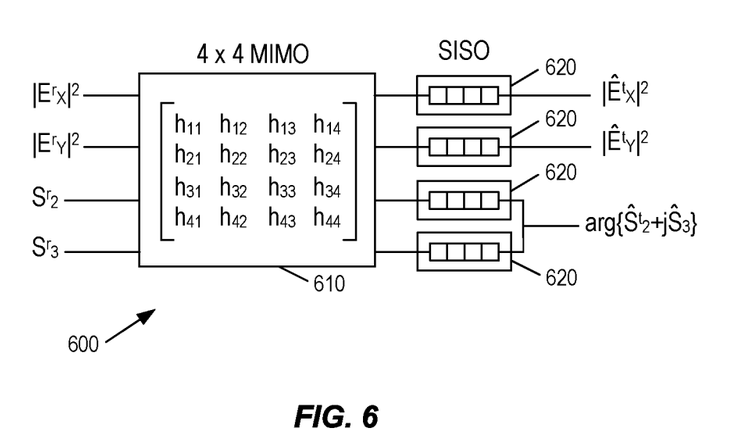
FIG. 6 illustrates details of another example digital signal processing stack, according to some embodiments.

An optical receiver for recovering the three information streams from the optical signal produced by optical transmitter 500 thus further comprises a digital signal processing circuit configured to carry out the digital signal processing stack 600 shown in FIG. 6. Digital signal processing stack 600 performs the polarization demultiplexing, correcting for (i.e., inverting) the unknown the polarization rotation imposed on the signal between the transmitter and receiver, and recovers the originally transmitted information from the demultiplexed modulation signals. In some embodiments, the DSP further mitigates receiver-side inter-symbol interference (ISI).

The first stage of the DSP stack is a 4×4 multiple-input multiple-output (MIMO) filter 610, which inverts the polarization rotation and mitigates mainly receiver-side inter-symbol interference (ISI). Four error signals are evaluated, based on the difference between the desired equalizer outputs and the four current outputs, in a manner corresponding to that described above in connection with FIG. 4. The error signals are used to update the taps of all 16 FIR filters of the 4×4 MIMO filter 610, using their respective inputs, which are updated using the stochastic gradient descent algorithm. More specifically, the equalizer is initially updated using training symbols before switching to a decision-directed mode. The second stage in the DSP stack shown in FIG. 6 comprises four single-input single-output (SISO) FIR filters 620, which are used to remove any residual ISI uncompensated by the first stage, and mainly residual transmitter-side ISI. Finally, estimates of the three information streams are obtained, corresponding to $|\hat{E}_x^t|^2$, $|\hat{E}_y^t|^2$, and the angle of the complex sum $\hat{S}_2^r+j\hat{S}_3^r$.

Figure 7:
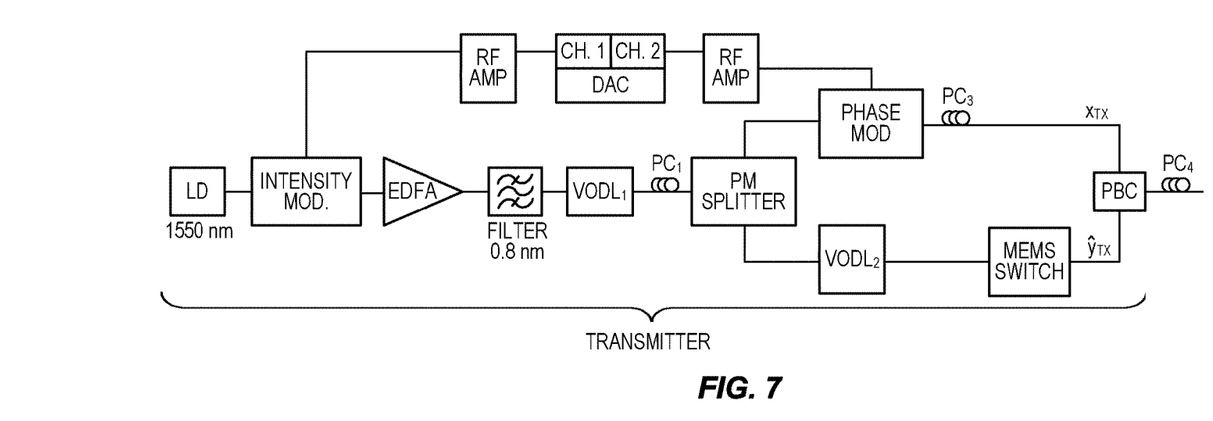
FIG. 7 illustrates an experimental transmitter setup.
Figure 8:
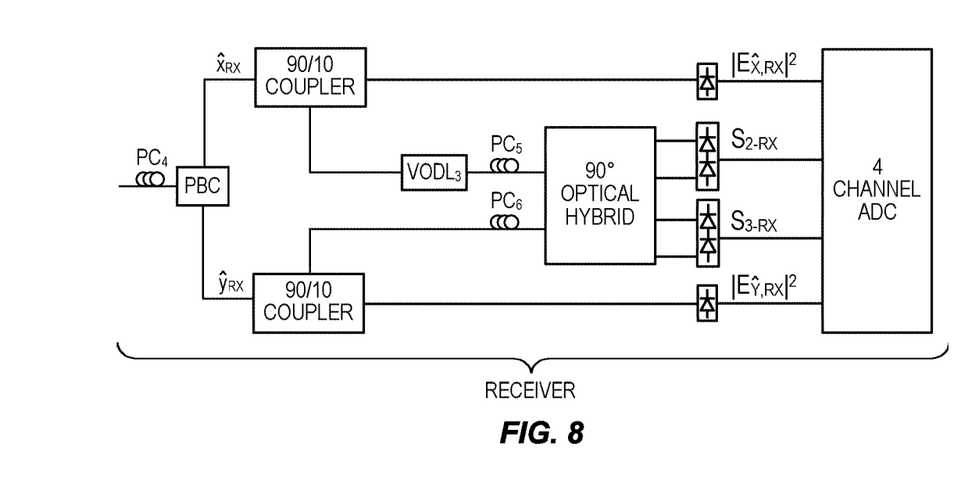
FIG. 8 illustrates an experimental receiver setup.

A more detailed schematic diagram of an example transmitter assembled for demonstration purposes is shown in FIG. 7, while FIG. 8 shows a detailed schematic diagram of a corresponding receiver. In the example setup shown in FIG. 7, a 14.3-dBm laser diode (LD) at 1550 nm is intensity modulated at the transmitter by a 41-GHz silicon photonic modulator. A radio-frequency (RF) amplifier amplifies a 70-GSamples/s information signal from an 8-bit digital-toanalog converter (DAC) channel. The single polarization intensity modulated (IM) light from the modulator, at about −4 dBm, is amplified by an erbium-doped fiber amplifier (EDFA) and filtered by a 0.8 nanometer tunable filter to remove out-of-band noise. A polarization controller PC1 aligns the SOP to the axis of a polarization-maintaining splitter before entering the dual polarization emulator. One output port is phase modulated by a low-$V\pi$ LiNbO3 phase modulator that is driven by another amplified DAC channel, which thus allows modulating a phase difference between the two orthogonal IM signals. The other output port is delayed by a variable optical delay line VODL2, allowing recombination at the polarization beam combiner (PBC) with the desired optical path difference. An optical on-off switch and two polarization controllers PC1 and PC2 allow for comparing and equating the power on each polarization after the PBC. Before the emulator, a variable optical delay line VODL1 delays the IM waveform such that the PM waveform is applied at the proper time on the IM field.

The transmitter DSP for generating the IM can be that reported previously in M. Chagnon, et al., Opt. Exp. vol. 22, no. 17, 2014, the contents of which are incorporated by reference herein. Similar processing can be applied to the PM signal, without the MZM arcsin compensation. It should be appreciated that several of the components used in the transmitter of FIG. 5 (e.g., the EDFA, filter, PCs), which is suitable for experimental purposes, would not be required when realizing a fully integrated transmitter as shown in FIG. 5.

The receiver in FIG. 8 comprises a polarization beam splitter (PBS) that separates the received signal on two fixed orthogonal polarization axes, followed by two 90/10 couplers. The 10% ports of each coupler go to two photoreceivers, each comprising a PIN photodiode and a transimpedance amplifier (TIA), generating $|E_x^r|^2$ and $|E_y^r|^2$. Note that uneven coupling ratios are used in the experimental setup depicted in FIG. 8, because the two balanced photodetectors (BPDs) following the hybrid do not have TIAs. Optical time alignment is assured prior to entering the 90° optical hybrid, using variable optical delay line VODL3 and polarization controllers PC5 and PC6. The two balanced photodetectors generate the receiver signal components $S_2^r$ and $S_3^r$. A 4-channel, 8-bit, 80-Gsamples/s analog to digital converter (ADC) real-time samples the four received waveforms for subsequent recovery of the information signals from the detected signal components. In the experimental setup, these four waveforms are first resampled at two samples per symbol, before being fed to the two-stage DSP stack of FIG. 6. Finally, hard decisions are performed for the received symbols; in the experimental setup, a bit-error-rate (BER) is calculated to evaluate the performance of the setup. In a live embodiment, the signal can of course be processed immediately, without storing, using, for example, an application-specific integrated circuit (ASIC) that performs real-time DSP operations on the digital samples obtained by sampling the analog signals at the outputs of the photodetectors.

FIGS. 9A, 9B, and 9C illustrate BER performance for the experimental setup shown in FIGS. 7 and 8, over varying bit rates and SOPs. For FIG. 9A, the symbol rate of the 6 bits/symbol DP-PAM4+4PM format is varied from 28 Gbaud to 58.4 Gbaud, and information is recovered using the DSP presented above. BERs below the HD-FEC threshold are obtained up to ≈300 Gbps, while a BER of $1.6\times10^{-2}$ is obtained at a throughput of 350 Gbps, below the SD-FEC threshold. Crosses at 280 Gbps and 350 Gbps are added to the figure, as those bitrates represent 250 Gbps and 280 Gbps of data payload below HD and SD-FEC with respective overheads of 12% and 25%.

FIG. 9B shows the performance degradation on the intensity modulation when phase modulation is enabled, for both single polarization (SP) and dual polarization (DP), using the MEMS on-off switch. As all possible transmission configurations are presented, namely SP or DP with PM on or off, the DSP stack presented for the full DP-PAM4+4PM format cannot be applied. In order to de-embed the SOP rotation penalty from the application of PM, the SOP is aligned to the receiver's axes, and regular PAM4 IM/DD DSP is used, as reported in M. Chagnon, et al., Opt. Exp. vol. 22, no. 17, 2014, on available IM signals present on the receiver. FIG. 9B shows the strong deterioration of the intensity modulated signals, on both orthogonal polarizations, even if PM is applied to only one polarization axis. At 42 Gbaud, turning the PM on increases the BER 50-fold, while at 56 Gbaud it increases from $=10^{-3}$; to $8\times10^{-3}$. The deterioration of the IM signal due to PM is because of the undesired amplitude modulation components that arise from generating the optical phase modulated signal. The larger deterioration at lower symbol rates is due to the larger available RF swing on the PM with decreasing symbol rates.

FIG. 9C presents the BER of the DP-PAM4+4PM format at 56 Gbaud, as the received SOP is varied from 0° to 45° and processed with the MIMO/SISO receiver DSP. The rising BER with increasing rotation angle $\square$=arcsin(|b|) from 0° to 45° occurs because the received signal power on the two PIN+TIA detectors increases as the cross term $2\text{Re}\{ab^*\}$ in $|aE_x^r-bE_x^r|^2$ grows. If the received power is optimized at 0°, the TIAs will begin to saturate, with increasing angle, to the point where the received power is almost doubled when the angle reaches 45°. Moreover, each of the four photoreceivers/detectors has its own frequency response that induces inter-symbol interference on the received power vectors. As the ISI increases, there is be an increased penalty associated with using a small number of taps in the first derotation stage, as the second stage SISOs are not able to cancel residual cross talk from other channels.

Figure 10:
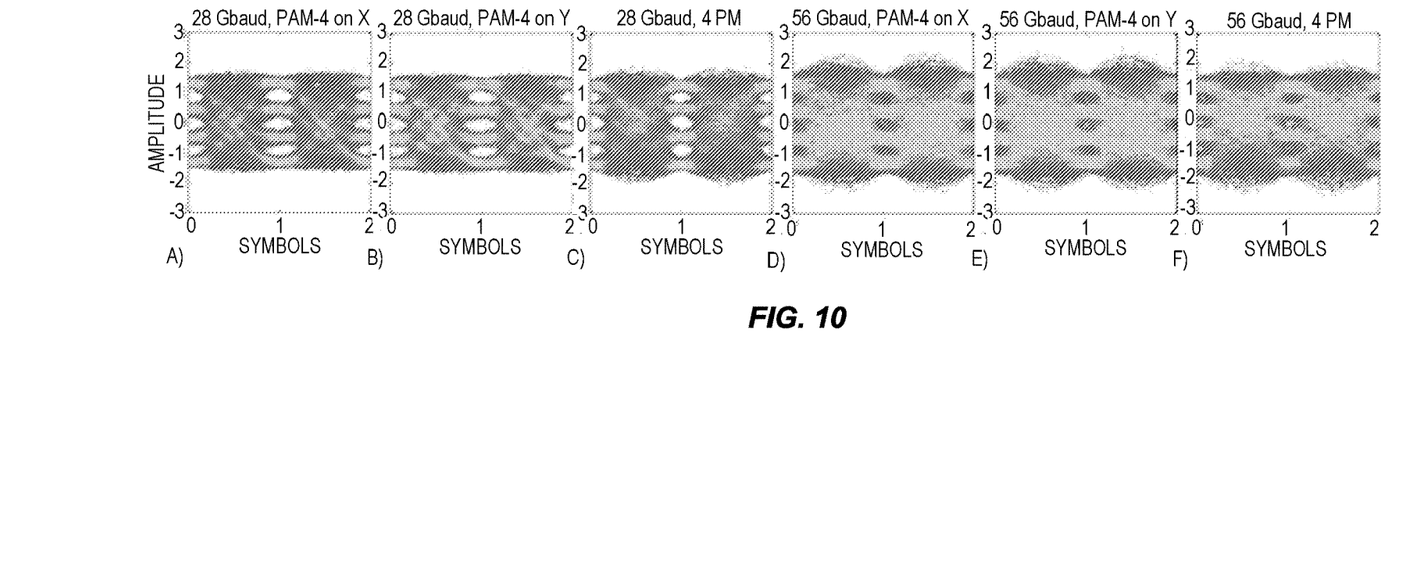
FIG. 10 illustrates measured eye diagrams obtained from an example system.

Finally, FIG. 10 shows the eye diagrams of the IM PAM4 on the x and y states of polarization and the four phases of the inter-polarization phase modulation, at 28 and 56 Gbaud.

It should be noted that at 1550 nm, the demonstration wavelength, propagation of signals with this modulation format over short distances was not feasible because of the inherent interplay between phase modulation and chromatic dispersion (CD). It is known that chromatic dispersion converts phase modulation to intensity modulation. This CD-PM interplay would be strongly minimized by operating around 1310 nm which, as per IEEE Std 802.3ba, is the defined operating wavelength for short reach optics.

Figure 9:
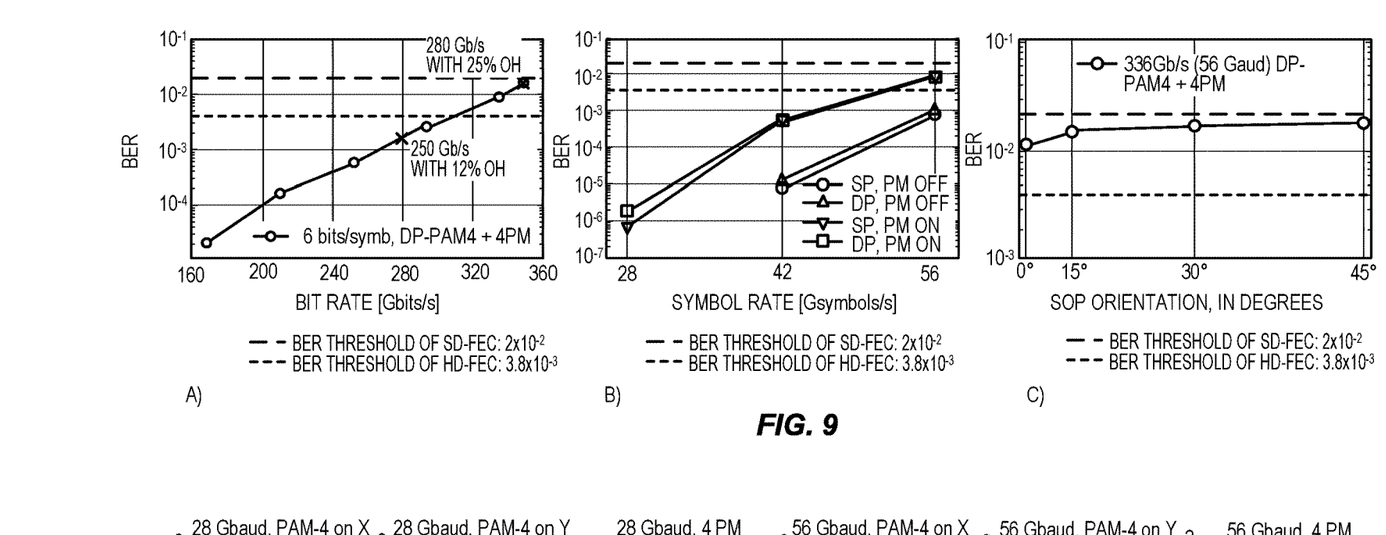
FIGS. 9A, 9B, and 9C illustrate performance measurements of a system according to an embodiment.

As indicated by the example performance results shown in FIGS. 9 and 10, a polarization-multiplexed intensity with inter-polarization phase modulation transceiver using direct-detection has been demonstrated at 280 and 350 Gbps, below the HD and SD-FEC thresholds, on a single wavelength. A novel two-stage 4-by-4 MIMO/SISO receiver DSP operating on the 4D power space after a direct detection receiver was presented and employed for derotation and symbol recovery. All components of the transmitter and receiver can be fabricated and integrated on a single chip operating at 1310 nm using demonstrated silicon photonics components.

In view of the detailed examples provided above and illustrated in the accompanying figures, it will be appreciated that novel features of the techniques and apparatus described herein include the use of a transmitter that modulates a single-wavelength laser signal with multi-level amplitude modulation on each of two polarizations, with an additional multi-level inter-polarization phase modulation. In an experimental setup, four-level amplitude modulation is used on each of the two polarizations, and four-phase inter-polarization phase modulation is used. Other numbers of levels may be used, in variations of the disclosed techniques.

Other novel aspects of the techniques and apparatus described herein include a receiver that includes a DSP algorithm that recovers, simultaneously, the information on the multiple intensities imprinted by the transmitter on each polarization and, in some embodiments, the information from the multi-level inter-polarization phase modulation.

More particularly, an example transmitter according to some embodiments includes a laser and a polarizing beam splitter coupled to the output of the laser to produce first and second optical signals having first and second polarizations, respectively. These polarizations may be at least substantially orthogonal, in some embodiments. First and second intensity modulators are configured to impress multi-level intensity modulation on the first and second polarizations, respectively, based on first and second multi-level modulation signals derived from respective first and second information streams. A phase modulator further impresses a multi-level phase modulation on the intensity-modulated output of the first intensity modulator, using a multi-level phase modulation signal derived from a third information stream. The output from the second intensity modulator and the output from the phase modulator are combined, using a phase maintaining combiner, for transmission.

It will be appreciated that the order of the first intensity modulator and the phase modulator may be reversed, in some embodiments. Further, it will be appreciated that some embodiments may use a polarization-maintaining optical beam splitter along with one or more polarization rotators in the branches between the polarization-maintaining optical beam splitter and the polarization beam combiner, with the polarization rotators producing orthogonal or substantially orthogonal states of polarization between the differently modulated optical signals, as combined for transmission. Some of such embodiments may include a 90-degree polarization rotator following the intensity modulator in one of the branches, for example. Some embodiments may use various combinations of polarization controllers and variable optical delay lines to ensure that an appropriate relative polarization between the two branches of the transmitter is achieved, prior to the combining of the modulated signals for transmission.

An example receiver according to some embodiments of the apparatus and techniques described herein includes an optical receiver front-end configured to receive an intensity-modulated, PDM optical signal with inter-polarization modulation as produced by a transmitter like those summarized above. The front-end, according to some embodiments, is configured to detect the time-varying intensity for each of first and second orthogonal polarizations of the received signal, and to detect signals proportional to $S_2=2\text{Re}\{E_xE_y^*\}$ and $S_3=2\text{Im}\{E_xE_y^*\}$), where $E_x$ and $E_y$ are the first and second orthogonal polarizations of the received signal.

An example receiver according to further embodiments of the apparatus and techniques described herein includes a digital signal processing circuit that takes, as input, digitized versions of the detected time-varying intensity for each of first and second intensity-modulated orthogonal polarizations of the received signal, and the signals proportional to $S_2=2\text{Re}\{E_xE_y^*\}$ and $S_3=2\text{Im}\{E_xE_y^*\}$, where $E_x$ and $E_y$ are the first and second orthogonal polarizations of the received signal. The digital signal processing circuit performs polarization demultiplexing of the orthogonal intensity-modulation, and demodulates the intensity modulation signal from each polarization, to recover first and second information signals used to impress the intensity modulation on the orthogonal polarizations. The digital signal processing circuit also demodulates inter-polarization phase modulation between the two polarizations, using the signals proportional to $S_2=2\text{Re}\{E_xE_y^*\}$ and $S_3=2\text{Im}\{E_xE_y^*\}$, to recover a third information signal that was used to impress the inter-polarization phase modulation on the received signal prior to its transmission.

In some embodiments, the digital signal processing circuit implements a 4×4 multiple-input multiple-output (MIMO) filter that inverts the polarization rotation imposed on the signal between the transmitter and receiver. In some embodiments, this MIMO filter further mitigates receiver-side inter-symbol interference (ISI). In some embodiments, four error signals are evaluated, based on the difference between desired equalizer outputs and the four current outputs. The error signals are used to update the taps of all 16 FIR filters of the 4×4 MIMO, using their respective inputs, which are updated using the stochastic gradient descent algorithm. In some embodiments, the equalizer so formed is initially updated using training symbols before switching to a decision-directed mode, from which information-carrying symbols are produced. In some embodiments, the digital signal processing circuit further implements four single-input single-output (SISO) FIR filters, which operate on the outputs from the 4×4 MIMO filter to remove any residual ISI uncompensated by the first stage and residual transmitter-side ISI. Estimates of the three information streams are obtained from the outputs of these SISO FIR filters, in these embodiments.

It will also be appreciated, in view of the detailed examples described above, that FIGS. 11 and 12 illustrate process flow diagrams corresponding to example methods carried out in embodiments of the transmitter and receiver described above.

Figure 11:
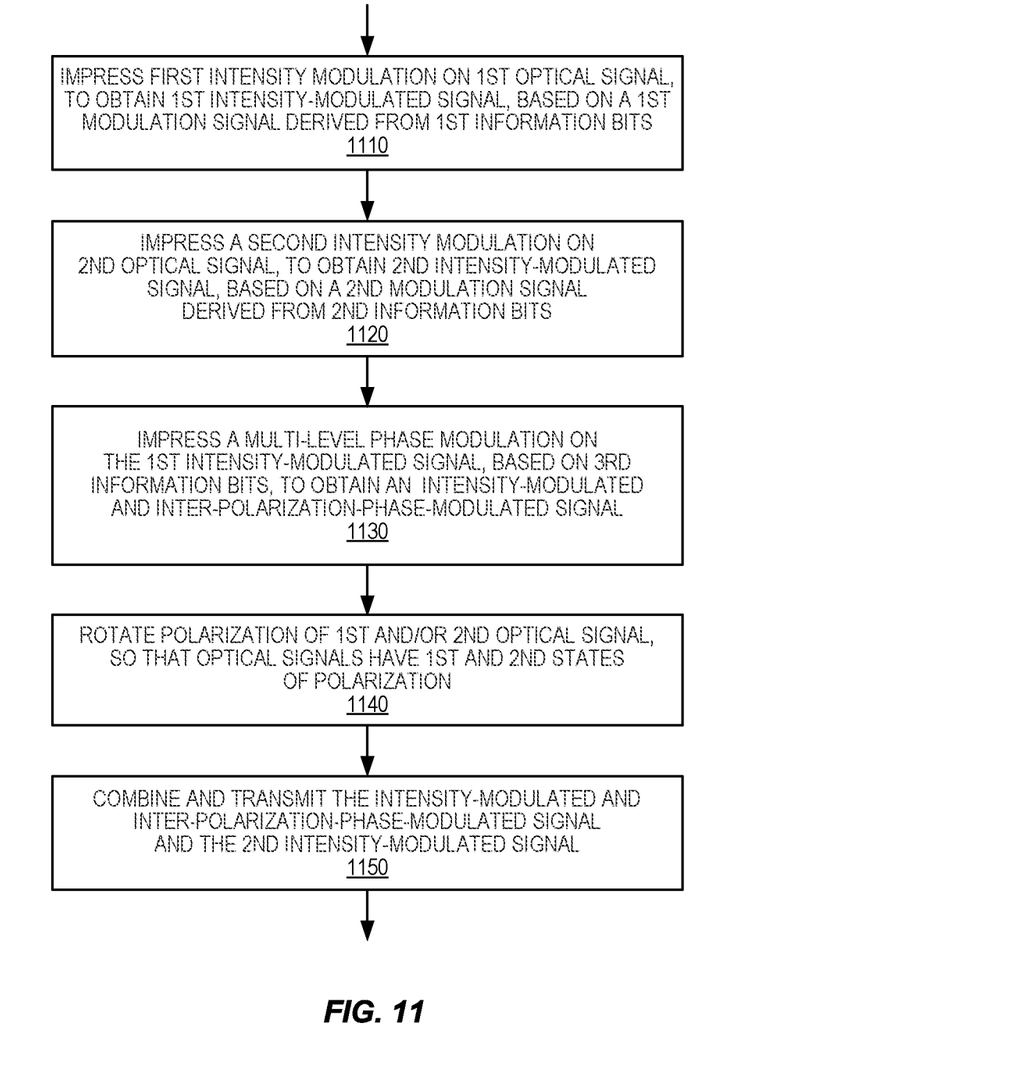
FIG. 11 is a process flow diagram illustrating an example method according to some embodiments of the described techniques.

The method illustrated in FIG. 11 includes, as shown at block 1110, impressing a first intensity modulation on a first optical signal, to obtain a first intensity-modulated signal, wherein the first intensity modulation is based on a first modulation signal derived from a first stream of information bits. The method further includes, as shown at block 1120, impressing a second intensity modulation on a second optical signal, to obtain a second intensity-modulated signal, wherein the second intensity modulation is based on a second modulation signal derived from a second stream of information bits. As shown at block 1130, the method further includes impressing a multi-level phase modulation on the first intensity-modulated signal, to obtain an intensity-modulated and inter-polarization-phase-modulated signal. As shown at block 1140, the polarization of the first optical signal or the second optical signal is rotated. Note that this rotation may be performed before or after the impressing of the intensity modulation, in various embodiments. Finally, as shown at block 1150, the intensity-modulated and inter-polarization-phase-modulated signal and the second intensity-modulated signal are combined, and the combined signal is transmitted via an optical fiber. The rotating of the polarization of the first optical signal or the second optical signal is performed in such a way that the intensity-modulated and inter-polarization-phase-modulated signal and the second intensity-modulated signal, as combined and transmitted, have first and second optical states of optical polarization. These first and second states of optical polarization are preferably at least substantially orthogonal.

Figure 12:
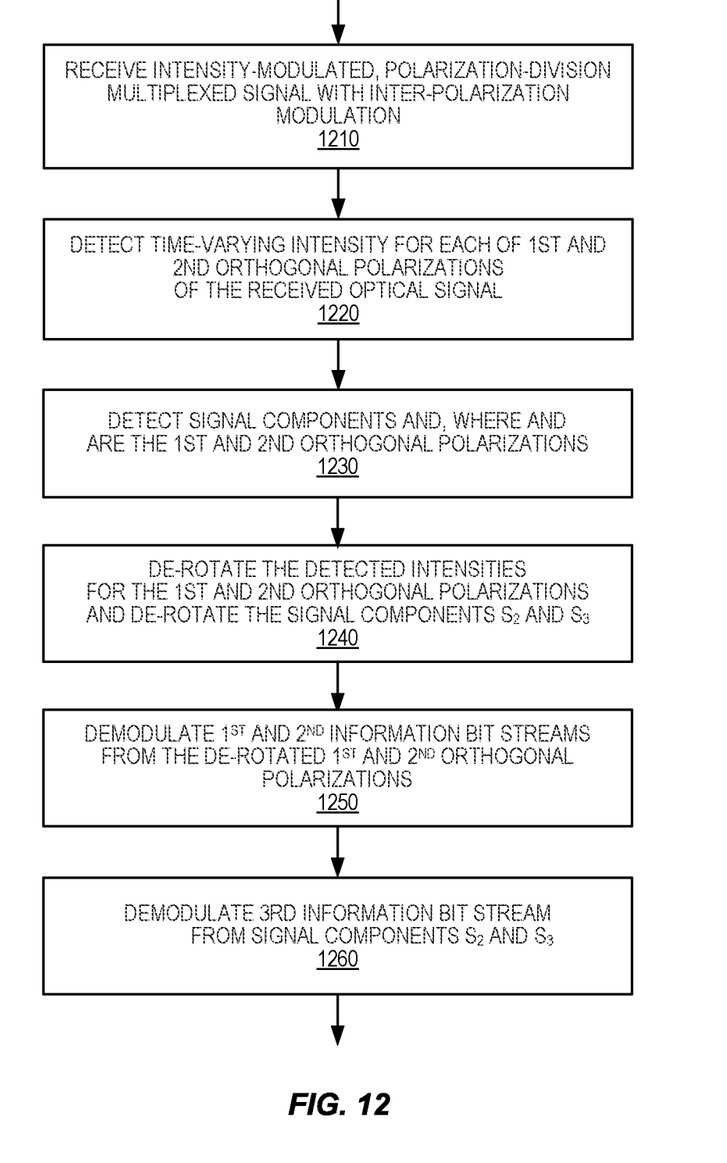
FIG. 12 is a process flow diagram illustrating another example method according to some embodiments of the described techniques.

The method illustrated in FIG. 12 includes, as shown at block 1210, receiving an intensity-modulated, polarization-division multiplexed optical signal with inter-polarization modulation. The method further includes detecting a time-varying intensity for each of first and second orthogonal polarizations of the received optical signal, as shown at block 1220. As shown at block 1230, signal components $S_2=2\text{Re}\{E_xE_y^*\}$ and $S_3=2\text{Im}\{E_xE_y^*\}$ are detected, where $E_x$ and $E_y$ are the first and second orthogonal polarizations of the received optical signal. As shown at block 1240, the detected intensities for the first and second orthogonal polarizations of the received optical signal and the signal components $S_2$ and $S_3$ are de-rotated. First and second information bit streams are detected from the de-rotated first and second orthogonal polarizations of the received optical signal, as shown at block 1250, and a third information bit stream is demodulated from the angle of the sum of signal components $S_2$ and $jS_3$, as shown at block 1260. It will be appreciated that the variations and/or additional details provided above in the detailed description of FIGS. 1-8 are equally applicable to the methods illustrated in FIGS. 11 and 12.

More generally, modifications and other embodiments of the disclosed inventions will come to mind to one skilled in the art having the benefit of the teachings presented in the foregoing descriptions and the associated drawings. Therefore, it is to be understood that the presently disclosed inventions are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An optical transmitter, comprising:
   a laser having an output;
   an optical beam splitter having an input coupled to the output of the laser and two outputs configured so as to produce first and second optical signals;
   first and second optical intensity modulators having respective inputs coupled to the outputs of the optical beam splitter and configured to impress multi-level intensity modulation on the first and second optical signals, respectively, based on respective first and second information streams;
   a phase modulator coupled in line with the second optical intensity modulator and configured to impress a multi-level phase modulation on the second optical signal, using a multi-level phase modulation signal derived from a third information stream; and
   an optical beam combiner having first and second inputs coupled to receive the intensity-modulated first optical signal and the intensity-and-phase-modulated second optical signal, respectively, and configured to combine the intensity-modulated first optical signal and the intensity-and-phase-modulated second optical signal to produce a polarization-multiplexed optical signal for transmission;
   wherein the optical transmitter is configured so that the intensity-modulated first optical signal and the intensity-and-phase-modulated second optical signal in the polarization-multiplexed optical signal have first and second optical states of polarization, respectively.

2. The optical transmitter of claim 1, wherein the optical beam splitter is a polarizing beam splitter configured to produce first and second optical signals having the first and second optical states of polarization, respectively, wherein the first and second optical states of polarization are substantially orthogonal.

3. The optical transmitter of claim 1, wherein the optical beam splitter is a non-polarizing beam splitter and wherein the optical transmitter further comprises one or more polarization rotators coupled in line with the first or second optical intensity modulators and configured to produce the first and/or second optical states of polarization.

4. The optical transmitter of claim 1, further comprising first, second, and third driver circuits configured to generate the first, second, and third multilevel modulation signals from respective first, second, and third information streams.

5. An optical receiver, comprising:
   an optical receiver front-end configured to receive a polarization-multiplexed optical signal and to split the polarization-multiplexed optical signal into sub-components comprising first and second signals, proportional to a time-varying intensity for each of first and second orthogonal states of polarization of the received signal, respectively, and third and fourth signals proportional to $S_2^r=2\text{Re}\{E_x^rE_y^{r*}\}$ and $S_3^r=2\text{Im}\{E_x^rE_y^{r*}\}$, respectively, where $E_x^r$ and $E_y^r$ are complex time-varying values for the first and second orthogonal states of polarization of the received signal, respectively;
   a digital signal processing circuit operatively coupled to the optical receiver front-end and configured to receive digitized versions of the first, second, third, and fourth signals, said digital signal processing circuit being further configured to implement a matrix arrangement of Finite Impulse Response, FIR, filters receiving the digitized versions of the first, second, third, and fourth signals and to thereby substantially remove polarization rotation induced by transmission of the polarization-multiplexed optical signal from a polarization-division-multiplexing optical transmitter to the optical receiver and estimate first and second information streams used by the polarization-division-multiplexing optical transmitter to intensity-modulate first and second optical states of polarization in the transmitted polarization-multiplexed optical signal.

6. The optical receiver of claim 5, wherein the matrix of FIR filters comprises four 1×1 FIR filters, inputs to the four 1×1 FIR filters corresponding to a sum of the digitized versions of the first and second signals, a difference between the digitized versions of the first and second signals, the digitized version of the third signal, and the digitized version of the fourth signal, and wherein the digital processing circuit is configured to:
   obtain an estimate of the first information stream by summing outputs of the four 1×1 FIR filters; and
   obtain an estimate of the second information stream by summing outputs of three of the four 1×1 FIR filters and subtracting the summed outputs of the three of the four 1×1 FIR filters from the output of the fourth 1×1 FIR filter, the input to the fourth 1×1 FIR filter being the sum of the digitized versions of the first and second signals.

7. The optical receiver of claim 5, wherein the matrix of FIR filters comprises a 4×4 filter matrix followed by four 1×1 filters coupled to respective outputs of the 4×4 filter matrix, wherein the inputs to the 4×4 filter matrix are coupled to digitized versions of the first, second, third, and fourth signals, respectively, and wherein the digital processing circuit is configured to:

obtain an estimate of the first information stream from the output of a first one of the four 1×1 filters;

obtain an estimate of the second information stream from the output of a second one of the four 1×1 filters; and obtain an estimate of a third information stream by summing, in a complex fashion, the outputs of the third and fourth ones of the four 1×1 filters and computing the angle of the result, the third information stream corresponding to a time-varying phase difference between the first and second optical states of polarization in the transmitted polarization-multiplexed optical signal, as imposed by a polarization-division-multiplexing optical transmitter.

8. The optical receiver of claim 5, wherein the digital signal processing circuit is further configured to generate error signals, based on the differences between the outputs of the matrix arrangement and corresponding desired outputs, and to update coefficients of the FIR filters in the matrix arrangement, based on the error signals, so as to reduce subsequent differences between the outputs of the matrix arrangement and the corresponding desired outputs.

9. The optical receiver of claim 8, where the digital signal processing circuit is configured to initialize the coefficients of the FIR filters using a portion of the received optical signal having training symbols with known values, and to subsequently switch to a decision-directed mode in which the estimates produced by the multi-input filter correspond to information-carrying symbols.

10. The optical receiver of claim 9, wherein the digital signal processing circuit is configured to generate the error signals during the decision-directed mode by comparing the outputs of the multi-input filter to desired outputs generated from symbol values obtained by making hard-detection decisions from the information signal estimates.

11. A method of generating a modulated optical signal, comprising:

impressing a first intensity modulation on a first optical signal, to obtain a first intensity-modulated signal, wherein the first intensity modulation is based on a first modulation signal derived from a first stream of information bits;

impressing a second intensity modulation on a second optical signal, to obtain a second intensity-modulated signal, wherein the second intensity modulation is based on a second modulation signal derived from a second stream of information bits;

impressing a multi-level phase modulation on the first intensity-modulated signal, to obtain an intensity-modulated and inter-polarization-phase-modulated signal, wherein the multi-level phase modulation is based on a third modulation signal derived from a third stream of information bits; and rotating the polarization of the first optical signal or the second optical signal, or both;

combining the intensity-modulated and inter-polarization-phase-modulated signal and the second intensity-modulated signal and transmitting the combined signal via an optical fiber;

wherein rotating the polarization of the first optical signal or the second optical signal, or both, is performed in such a way that the intensity-modulated and inter-polarization-phase-modulated signal and the second intensity-modulated signal, as combined and transmitted, have first and second states of optical polarization.

12. The method of claim 11, wherein the first and second optical states of polarization are substantially orthogonal.

13. The method of claim 11, wherein the method further comprises generating the first, second, and third modulation signals from respective first, second, and third information streams.

14. A method, comprising:

receiving an intensity-modulated, polarization-division multiplexed optical signal with inter-polarization phase modulation;

detecting a time-varying intensity for each of first and second orthogonal polarizations of the received optical signal;

detecting signal components $S_2^r = 2\text{Re}\{E_x^r E_y^{r*}\}$ and $S_3^r = 2\text{Im}\{E_x^r E_y^{r*}\}$, where $E_x^r$ and $E_y^r$ are the first and second orthogonal polarizations of the received signal;

de-rotating the detected intensities for the first and second orthogonal polarizations of the received optical signal and the detected signal components $S_2^r$ and $S_3^r$, so as to compensate for polarization rotation imposed on the signal between a transmitter of the received optical signal and said detecting operations;

demodulating first and second information bit streams from the de-rotated first and second orthogonal polarizations of the received optical signal, the first and second information bit streams corresponding to first and second polarization-division-multiplexed intensity modulations on the optical signal as received; and demodulating a third information bit stream from de-rotated signal components $S_2$ and $S_3$ corresponding to the detected signal components $S_2^r$ and $S_3^r$, the third information bit stream corresponding to the inter-polarization phase modulation on the optical signal as received.

15. The method of claim 14, wherein said de-rotating comprises using a multi-input filter to compensate for a misalignment between the modulated states of polarization on the received signal and the polarization axes of a polarization beam splitter used to obtain the first and second orthogonal polarizations of the received optical signal, so as to produce, as filter outputs, estimates $\hat{E}_x^t$ and $\hat{E}_y^t$ of the first and second information signals used to impress the intensity modulation on the orthogonal polarizations and estimates of signals proportional to $\hat{S}_2^t = 2\text{Re}\{\hat{E}_x^t \hat{E}_y^{t*}\}$ and $\hat{S}_3^t = 2\text{Im}\{\hat{E}_x^t \hat{E}_y^{t*}\}$.

16. The method of claim 15, wherein demodulating the third information bit stream comprises combining the estimates of signals proportional to $\hat{S}_2^t$ and $\hat{S}_3^t$, in a complex fashion, and computing the angle of the resulting complex number to recover an estimate of a third information signal used to produce the inter-polarization phase modulation.

17. The method of claim 14, further comprising:

generating four error signals, based on the differences between the four outputs of the multi-input filter and corresponding desired outputs; and updating coefficients of the multi-input filter, based on the four error signals, so as to reduce subsequent differences between the four outputs of the multi-input filter and the corresponding desired outputs.

18. The method of claim 17, further comprising initializing the coefficients of the multi-input filter using a portion of the received optical signal having training symbols with known values, and subsequently switching to a decision-directed mode in which the estimates produced by the multi-input filter correspond to information-carrying symbols.

19. The method of claim 18, further comprising generating the four error signals during the decision-directed mode by comparing the four outputs of the multi-input filter to desired outputs generated from symbol values obtained by making hard-detection decisions from the information signal estimates.

20. The method of claim 14, wherein the multi-input filter comprises a 4×4 multiple-input multiple-output, MIMO, filter configured to invert the polarization rotation imposed on the signal between a transmitter of the received optical signal and the optical receiver, and further comprises four single-input single-output, SISO, FIR filters configured to operate on the outputs from the 4×4 MIMO filter so as to remove residual inter-symbol interference uncompensated by the 4×4 MIMO filter.

* * * * *